United States Patent
Ona et al.

(10) Patent No.: US 6,528,121 B2
(45) Date of Patent: Mar. 4, 2003

(54) AQUEOUS TREATMENT AGENT FOR WIPING PAPER

(75) Inventors: Isao Ona, Chiba Prefecture (JP); Masaru Ozaki, Chiba Prefecture (JP); Kazuo Kobayashi, Chiba Prefecture (JP); Yoshitsugu Morita, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 12 days.

(21) Appl. No.: 09/827,795

(22) Filed: Apr. 6, 2001

(65) Prior Publication Data

US 2001/0051220 A1 Dec. 13, 2001

Related U.S. Application Data

(62) Division of application No. 09/440,191, filed on Nov. 15, 1999, now abandoned.

(30) Foreign Application Priority Data

Nov. 19, 1998 (JP) ............................................. 10-329200

(51) Int. Cl.⁷ ........................... B05D 3/02; D21H 11/24; B32B 25/20; C08L 83/04
(52) U.S. Cl. ........................ 427/387; 427/394; 427/395; 428/447; 428/452; 162/135; 162/164.4; 524/731; 524/837; 524/838; 524/860; 524/863; 524/869; 528/15; 528/17; 528/26; 528/26.5; 528/27; 528/32; 528/33; 528/38; 528/41

(58) Field of Search ................................ 524/731, 837, 524/838, 860, 863, 869; 528/15, 17, 26, 26.5, 29, 32, 33, 38, 41; 162/135, 164.4; 427/387, 394, 395; 428/447, 452

(56) References Cited

U.S. PATENT DOCUMENTS

| | | | | |
|---|---|---|---|---|
| 4,620,878 A | * | 11/1986 | Gee ...................... | 106/287.16 |
| 5,059,282 A | | 10/1991 | Ampulski et al. .......... | 162/111 |
| 5,164,046 A | | 11/1992 | Ampulski et al. .......... | 162/111 |
| 5,628,989 A | * | 5/1997 | Harashima et al. ......... | 424/400 |
| 5,648,083 A | * | 7/1997 | Blieszner et al. ........... | 424/402 |
| 5,807,956 A | * | 9/1998 | Czech ................... | 424/70.122 |
| 5,859,069 A | * | 1/1999 | Yanagida ................. | 424/78.03 |

OTHER PUBLICATIONS

English Abstract of JP 6311943, Nov. 1994.*
English Abstract of JP 07145596, Jun. 1995.*
English Abstract of JP 03000900, Jan. 1991.*
English Abstract of JP 02224626, Sep. 1990.*

* cited by examiner

*Primary Examiner*—Robert Dawson
*Assistant Examiner*—Jeffrey B. Robertson
(74) *Attorney, Agent, or Firm*—Roger E. Gobrogge; Charles Richard; Catherine U. Brown

(57) ABSTRACT

An aqueous treatment agent for wiping paper is capable of rendering tissue paper, toilet paper, and other types of wiping paper dry to the touch, highly smooth, nonsticky, and extremely soft while suppressing the slippery or wet feel thereof. The aqueous treatment agent comprises a water dispersion of a silicone rubber powder with an average particle diameter of 0.1 to 500 micrometers, a silicone oil, a surfactant, and water.

9 Claims, No Drawings

200
AQUEOUS TREATMENT AGENT FOR WIPING PAPER

CROSS-REFERENCE TO RELATED APPLICATIONS

This patent application is a divisional of U.S. patent application Ser. No. 09/440,191, filed Nov. 15, 1999 which is now abandoned.

FIELD OF THE INVENTION

This invention relates to an aqueous treatment agent for wiping paper, and more particularly to an aqueous treatment agent for wiping paper capable of rendering tissue paper, toilet paper, and other types of wiping paper dry to the touch, highly smooth, nonsticky, and extremely soft while suppressing the slippery or wet feel thereof.

BACKGROUND OF THE INVENTION

Tissue paper, toilet paper, and other types of wiping paper are disadvantageous in that they lack adequate softness or smoothness as such, and thus cause skin roughness/redness or pain when used frequently.

Examples of methods proposed to address this problem include methods in which these types of wiping paper are treated with a polydimethylsiloxane having hydrogen bond functional groups selected from among amino groups, carboxyl groups, hydroxyl groups, ether groups, polyether groups, aldehyde groups, ketone groups, amido groups, ester groups, and thiol groups (see Japanese Patent Applications Kokai 2-224626 and 3-900); methods of treatment with water dispersions of polyether group-containing polydiorganosiloxanes and amino group-containing polydiorganosiloxanes (see Japanese Patent Application 6-311943); and methods of treatment with polydiorganosiloxanes and polyhydric alcohols (see Japanese Patent Application 7-145596).

Wiping paper treated with these polydiorganosiloxanes is still disadvantageous because it lacks softness and still has a rough feel and an inadequate hand. A particular drawback is that a treatment performed using a polydiorganosiloxane containing amino groups results in an excessively slippery product with poor tactile attributes. A treatment performed using a polydiorganosiloxane containing polyether groups is disadvantageous in that it fails to produce adequate smoothness (slip).

An object of this invention is to provide an aqueous treatment agent for wiping paper capable of rendering tissue paper, toilet paper, and other types of wiping paper dry to the touch, highly smooth, nonsticky, and extremely soft while suppressing the slippery or wet feel thereof.

SUMMARY OF THE INVENTION

The aqueous treatment agent for wiping paper comprises a water dispersion of a silicone rubber powder with an average particle diameter of 0.1 to 500 µm.

DETAILED DESCRIPTION OF THE INVENTION

A distinctive feature of the present treatment agent is that it consists of a water dispersion of silicone rubber powder. Such a silicone rubber powder is a component designed to render wiping paper dry to the touch, highly smooth, nonsticky, and extremely soft while suppressing the slippery or wet feel thereof. The average particle diameter of the silicone rubber powder should fall within a range of 0.1 to 500 micrometers, preferably 0.1 to 100 micrometers, and ideally 0.5 to 50 micrometers. This is because a treatment agent containing a silicone rubber powder whose average particle diameter falls outside this range tends to become incapable of rendering wiping paper dry to the touch, highly smooth, nonsticky, and extremely soft while suppressing the slippery or wet feel thereof. The silicone rubber powder may be shaped as spherical, flat, or irregular particles, with spherical particles being particularly preferred. The silicone rubber powder should have a hardness (measured as type A durometer hardness in accordance with JIS K 6253) of 80 or lower, and preferably 65 or lower. This is because a treatment agent containing a silicone rubber powder whose hardness falls outside this range tends to be less likely to render wiping paper dry to the touch, highly smooth, nonsticky, and extremely soft while suppressing the slippery or wet feel thereof.

The treatment agent can be prepared by dispersing the silicone rubber powder in water, although a preparation procedure in which a silicone rubber composition is cured in advance as a dispersion in water is preferred because the silicone rubber powder as such tends to aggregate easily and is difficult to uniformly disperse in water when this silicone rubber powder has low hardness.

Methods in which a hydrosilylation reaction-curing silicone rubber composition, condensation reaction-curing silicone rubber composition, organic peroxide-curing silicone rubber composition, ultraviolet-curing silicone rubber composition, or other silicone rubber composition is cured while dispersed in water are examples of the method for preparing a water dispersion of silicone rubber powder by curing a silicone rubber composition as a dispersion in water. It is particularly suitable to use a method in which a hydrosilylation reaction-curing silicone rubber composition or a condensation reaction-curing silicone rubber composition is cured while dispersed in water with the aid of a surfactant.

Examples of hydrosilylation reaction-curing silicone rubber compositions include those comprising at least a polyorganosiloxane having two or more alkenyl groups per molecule, a polyorganosiloxane having two or more silicon-bonded hydrogen atoms per molecule, and a platinum-based catalyst.

Examples of condensation reaction-curing silicone rubber compositions include those comprising at least a polyorganosiloxane in which each atom has two or more hydrolyzable groups such as aminoxy groups, acetoxy groups, oxime groups, and alkoxy groups or hydroxyl groups bonded to silicon atoms; a silane-based cross-linking agent in which each atom has three or more hydrolyzable groups such as aminoxy groups, acetoxy groups, oxime groups, and alkoxy groups bonded to silicon atoms; and a condensation reaction catalyst such as an organotin compound or organotitanium compound.

Another distinctive feature of this invention is that a silicone rubber powder containing an uncross-linked silicone oil may be used as the silicone rubber powder, in which case the resulting treatment agent is even more effective in rendering wiping paper dry to the touch, highly smooth, nonsticky, and extremely soft while suppressing the slippery or wet feel thereof.

Examples of methods for preparing such a silicone rubber powder include methods in which a silicone oil that does not contribute to the curing reaction of a silicone rubber composition is premixed with the composition, which is then cured in powder form; and methods in which the silicone rubber powder is impregnated with silicone oil. The second group of methods is more preferred.

The uncross-linked silicone oil is an oil that can be merely added to a silicone rubber powder and then be allowed to naturally leak from the powder or be extracted with an organic solvent. Such a silicone oil may, for example, have a straight, cyclic, or branched molecular structure. A straight structure is preferred. Examples of such silicone oils include trimethylsiloxy-endblocked polydimethylsiloxanes, trimethylsiloxy-endblocked dimethylsiloxane/methylphenylsiloxane copolymers, trimethylsiloxy-endblocked dimethylsiloxane/methyl(3,3,3-trifluoropropyl)siloxane copolymers, and other unreactive silicone oils.

The following compounds are cited in addition to the aforementioned nonreactive silicone oils when these silicone oils are contained in advance in the silicone rubber composition for forming the silicone rubber powder: trimethylsiloxy-endblocked polydimethylsiloxanes that do not contribute to such curing reactions; polyorganosiloxanes obtained by substituting some of the methyl groups of these polydimethylsiloxanes with 3,3,3-trifluoropropyl groups, phenyl groups, or alkyl groups other than the methyl group; and other such silicone oils.

The following compounds may be cited in addition to the aforementioned nonreactive silicone oils when the curing reaction is an addition reaction: silanol-endblocked polydimethylsiloxanes; polyorganosiloxanes obtained by substituting some of the methyl groups of these polydimethylsiloxanes with 3,3,3-trifluoropropyl groups, phenyl groups, or alkyl groups other than the methyl group; and other such silicone oils. Additional examples include silicone oils that remain unreacted despite being capable of contributing to this curing reaction, such as dimethylvinylsiloxy-endblocked polydimethylsiloxanes, trimethylsiloxy-endblocked dimethylsiloxane/methylvinylsiloxane copolymers, dimethylhydrogensiloxy-endblocked polydimethylsiloxanes, trimethylsiloxy-endblocked dimethylsiloxane/methylhydrogensiloxane copolymers, and polyorganosiloxanes obtained by substituting some of the methyl groups of these polyorganosiloxanes with 3,3,3-trifluoropropyl groups, phenyl groups, or alkyl groups other than the methyl group. Polyorganosiloxanes obtained by substituting some of the methyl groups of these silicone oils with alkenyl groups, and other such silicone oils may be cited in addition to the aforementioned nonreactive silicone oils when the curing reaction is a condensation reaction. Additional examples include silicone oils that remain unreacted despite being capable of contributing to this curing reaction, such as silanol-endblocked polydimethylsiloxanes, and silicone oils obtained by substituting some of the methyl groups of these polydimethylsiloxanes with 3,3,3-trifluoropropyl groups, phenyl groups, alkenyl groups, or alkyl groups other than the methyl group. No particular restrictions are imposed on the type of silicone oil when the silicone rubber powder is impregnated with silicone oil.

These uncross-linked silicone oils should be liquid and have a 25° C. viscosity of 100,000 mPa·s or lower, preferably 50,000 mPa·s or lower, and ideally 10,000 mPa·s or lower. This is because an oil whose viscosity at 25° C. exceeds the aforementioned range tends to impede the formation of a silicone rubber powder having an average particle diameter of 500 micrometer or less, or to penetrate less readily into the silicone rubber powder. These uncross-linked silicone oils should preferably have the same organic groups as the silicone oil for forming the silicone rubber powder because of their excellent affinity for the silicone rubber powder.

The content of uncross-linked silicone oil in the silicone rubber powder should be 80 wt % or lower, preferably 50 wt % or lower. This is because of a danger that a silicone rubber powder whose uncross-linked silicone oil content exceeds this range will be difficult to prepare or that wiping paper treated with a treatment agent obtained using this powder will be sticky.

A surfactant should also be added to the present treatment agent to ensure that the silicone rubber powder is stably dispersed in water. Examples of such surfactants include primary to tertiary aliphatic amine salts, alkyltrimethylammonium salts, dialkyldimethylammonium salts, tetraalkylammonium salts, trialkylbenzylammonium salts, alkylpyridinium salts, N,N-dialkylmorpholinium salts, polyethylenepolyamine fatty acid amide salts, and other cationic surfactants; fatty acid salts, alkylbenzenesulfonates, alkylnaphthalenesulfonates, alkylsulfonates, α-olefinsulfonates, dialkylsulfosuccinates, α-sulfonated fatty acid salts, N-acyl-N-methyltaurate, alkylsulfates, sulfonated oils and fats, polyoxyethylene alkyl ether sulfonates, polyoxyethylene alkyl phenyl ether sulfonates, polyoxyethylene styrenated phenyl ether sulfonates, alkylphosphates, polyoxyethylene alkyl ether phosphates, polyoxyethylene alkyl phenyl ether phosphates, naphthalenesulfonate formaldehyde condensates, and other anionic surfactants; N,N-dimethyl-N-alkyl-N-carboxymethylammonium betaines, N,N-dialkylaminoalkylene carboxylates, N,N,N-trialkyl-N-sulfoalkyleneammonium betaines, N,N-dialkyl-N,N-bispolyoxyethyleneammonium sulfuric acid ester betaines, 2-alkyl-1-carboxymethyl-1-hydroxyethyl imidazolinium betaines, and other amphoteric surfactants; polyoxyethylene alkyl ethers, polyoxyethylene alkenyl ethers, polyoxyethylene alkyl phenyl ethers, polyoxyethylene polystyryl phenyl ethers, polyoxyethylene/polyoxypropylene glycols, polyoxyethylene/polyoxypropylene alkyl ethers, polyhydric alcohol fatty acid partial esters (sorbitan fatty acid esters, glycerin fatty acid esters, decaglycerin fatty acid esters, polyglycerin fatty acid esters, propylene glycol/pentaerythritol fatty acid esters, propylene glycol/pentaerythritol fatty acid esters, and the like), polyoxyethylene polyhydric alcohol fatty acid partial esters (polyoxyethylene sorbitan fatty acid esters, polyoxyethylene glycerin fatty acid esters, and the like), polyoxyethylene fatty acid esters, polyglycerin fatty acid esters, olyoxyethylenated castor oil, fatty acid diethanolamides, polyoxyethylene alkylamines, riethanolamine fatty acid partial esters, trialkylamine oxides, organopolysiloxanes containing polyoxyalkylene groups, and other nonionic surfactants; and mixtures of two or more of these surfactants. In particular, nonionic surfactants are preferred when the product is prepared by curing a silicone rubber composition as a dispersion in water.

Although no limitations are imposed on the amount in which the surfactants are added to the present treatment agent, this amount should preferably fall within a range of 0.1 to 20 weight parts, and particularly 0.5 to 10 weight parts, per 100 weight parts of the silicone rubber powder.

Another feature of the treatment agent is that water is used as the dispersion medium for dispersing the silicone rubber powder. No limitations are imposed on the amount in which water is added, but because of considerations related to the treatment efficiency of the present treatment agent, it is better for the content of the aforementioned silicone rubber composition to fall within a range of 1 to 90 wt %, preferably 5 to 90 wt %, and ideally 30 to 80 wt %.

Silicone oil, which is used in conventional practice as a treatment agent for wiping paper, may also be added as another arbitrary component to the present treatment agent. This silicone oil acts to endow wiping paper with softness, smoothness, and compression recoverability (sponginess). Polydiorganosiloxanes expressed by the general formula

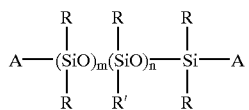

are examples. The R's express identical or different monovalent hydrocarbon groups having 1 to 20 carbon atoms, such as methyl, ethyl, propyl, butyl, or other alkyl groups; vinyl, allyl, or other alkenyl groups; or phenyl or other aryl groups. R' expresses identical or different monovalent organic groups selected from among amino, epoxy, carboxyl, oxyalkylene, mercapto, fluoroalkyl, carbinol, and amido groups. The A's may be the same or different, and are hydroxyl groups, alkoxy groups, monovalent hydrocarbon groups having 1 to 20 carbon atoms, amino groups, epoxy groups, carboxyl groups, oxyalkylene groups, mercapto groups, fluoroalkyl groups, carbinol groups, and amido groups. Methoxy, ethoxy, propoxy, and butoxy groups can be cited as examples of the alkoxy groups designated by A, and the same groups as those designated by R above are examples of the monovalent hydrocarbon groups designated by A. The m is an integer of 1 or greater; n is an integer of 0, 1, or greater; and (m+n) is an integer of at least 10.

Although no limitations are imposed on the viscosity of such a silicone oil, it should preferably fall within a range of 50 to 10,000 mPa·s, and particularly 500 to 5000 mPa·s, at 25° C. Examples of such silicone oils include polydimethylsiloxane, and polydiorganosiloxanes containing amino groups, epoxy groups, carboxyl groups, or polyether groups, and mixtures of two or more of these polydiorganosiloxanes.

The polydiorganosiloxanes containing amino groups are, for example, expressed by the general formula

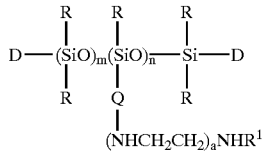

The R's express identical or different monovalent hydrocarbon groups having 1 to 20 carbon atoms. The same groups as above are examples. In particular, groups that are at least methyl groups are preferred. $R^1$ is a hydrogen atom, an acyl group, or a monovalent hydrocarbon group. Acetyl, propionyl, and butyryl groups are examples of the acyl groups designated by $R^1$. Methyl, ethyl, propyl, phenyl, and cyclohexyl groups are examples of the monovalent hydrocarbon groups designated by $R^1$. Q is a divalent hydrocarbon group such as methylene, ethylene, propylene, isopropylene, butylene, isobutylene, or another alkylene group, or an alkylene arylene group such as the group expressed by the formula —$(CH_2)_2$—$C_6H_4$—. In particular, an alkylene group is preferred, and the propylene group is particularly preferred. The D's in the above formula may be the same or different, and are hydroxyl groups, alkoxy groups, monovalent hydrocarbon groups, or amino groups expressed by the formula —Q—$(NHCH_2CH_2)_a$—$NHR^1$. Methoxy, ethoxy, propoxy, and butoxy groups are examples of the alkoxy groups designated by D, and the same groups as those designated by R above are examples of the monovalent hydrocarbon groups designated by D. The m is an integer of 1 or greater, and n is an integer of 1 or greater, but may be 0 when at least one of the two D's an amino group expressed by the formula —Q—$(NHCH_2CH_2)_a$—$NHR^1$. The sum (m+n) is preferably an integer of at least 10, and particularly an integer ranging from 100 to 1000. This is because using a polydiorganosiloxane containing amino groups for which the sum (m+n) is an integer of less than 10 makes it more difficult for the agent to be adsorbed inside the pulp cellulose constituting the wiping paper and to render the wiping paper dry to the touch, highly smooth, nonsticky, and extremely soft while suppressing the slippery or wet feel thereof. The a in the above formula expresses identical or different integers of 0 to 10. In particular, an integer of 0 or 1 is preferred. In a polydiorganosiloxane containing such amino groups, the amino groups expressed by the formula —Q—$(NHCH_2CH_2)_a$—$NHR^1$ may be bonded to the side chains of the molecular chain, to the ends of the molecular chain, or to both.

Examples of methods for preparing polydiorganosiloxanes containing such amino groups include methods in which a hydrosilylation reaction is allowed to occur between a polydiorganosiloxane having a silicon-bonded hydrogen atom and an amine compound having aliphatic unsaturated carbon-carbon bonds exemplified by the formula $CH_2$=C$(CH_3)CH_2NHCH_2NH_2$, or a condensation reaction is allowed to occur between an amine compound exemplified by the formula $H_2NCH_2CH_2NH_2$ and a polydiorganosiloxane having alkyl halide groups exemplified by the formula $CH_2CH_2CH_2Cl$ (see Japanese Unexamined Patent Application 53-98499).

Polydiorganosiloxanes containing epoxy groups are, for example, expressed by the general formula

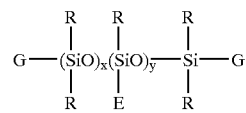

The R's express identical or different monovalent hydrocarbon groups having 1 to 20 carbon atoms. The same groups as above are examples. In particular, groups that are at least methyl groups are preferred. E expresses identical or different monovalent organic groups containing epoxy groups, such as the groups expressed by the general formula

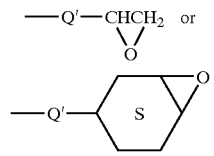

Q' is a divalent organic group such as methylene, ethylene, propylene, phenylene, chloroethylene, fluoroethylene, or another substituted or unsubstituted alkylene group; or a group expressed by the formula —$CH_2OCH_2CH_2CH_2$—, —$CH_2CH_2OCH_2CH_2$—, —$CH_2CH_2OCH(CH_3)CH_2$—, —$CH_2OCH_2CH_2OCH_2CH_2$—, or another alkyleneoxyalkylene group. The G's may be the same or different, and are hydroxyl groups, alkoxy groups, monovalent hydrocarbon groups having 1 to 20 carbon atoms, or monovalent organic groups containing epoxy groups. Methoxy, ethoxy, propoxy, and butoxy groups are examples of the alkoxy groups designated by G, and the same groups as those designated by R above are examples of the monovalent hydrocarbon groups designated by G. The same groups as those designated by E above are examples of the monovalent organic groups containing epoxy groups designated by G. The x is an integer from 0 to 2000, and y is an integer from 1 to 200, but may be 0 when at least one of the two G's is a monovalent organic group containing epoxy groups. The sum (x+y) is preferably an integer of at least 10, and particularly an integer ranging from 100 to 2000. Using a polydiorganosiloxane for which the sum (x+y) is an integer of less than 10 sometimes makes it more difficult for the agent to be adsorbed inside the pulp cellulose and renders the agent less effective in imparting the desired smoothness or softness. In a polydiorganosiloxane containing such epoxy groups, the monovalent organic groups containing the epoxy groups may be bonded to the side chains of the molecular chain, to the ends of the molecular chain, or to both.

Polydiorganosiloxanes containing carboxyl groups are, for example, expressed by the general formula

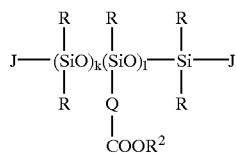

The R's express identical or different monovalent hydrocarbon groups having 1 to 20 carbon atoms. The same groups as above are examples. In particular, groups that are at least methyl groups are preferred. $R^2$ is a hydrogen atom or a monovalent hydrocarbon group. Methyl, ethyl, propyl, hexyl, phenyl, and cyclohexyl groups are examples of the monovalent hydrocarbon groups designated by $R^2$. Q is a divalent hydrocarbon group. The same groups as above may be cited as examples. The J's may be the same or different, and are hydroxyl groups, alkoxy groups, monovalent hydrocarbon groups having 1 to 20 carbon atoms, or carboxyl groups expressed by the formula —Q—$COOR^2$. Methoxy, ethoxy, propoxy, and butoxy groups are examples of the alkoxy groups designated by J, and the same groups as those designated by R above are examples of the monovalent hydrocarbon groups designated by J. The k is an integer of 1 or greater, and l is an integer of 1 or greater, but may be 0 when at least one of the two J's is a carboxyl group expressed by the formula —Q—$COOR^2$. The sum (k+l) should preferably be an integer of at least 10, and particularly an integer ranging from 100 to 1000. This is because using a polydiorganosiloxane for which the sum (k+l) is an integer of less than 10 sometimes makes it more difficult for the agent to be adsorbed inside the pulp cellulose and renders the agent less effective in imparting the desired smoothness or softness. In a polydiorganosiloxane containing carboxyl groups, the carboxyl groups expressed by the formula —Q—$COOR^2$ may be bonded to the side chains of the molecular chain, to the ends of the molecular chain, or to both.

Not only can a polydiorganosiloxane containing polyether groups impart smoothness and softness to wiping paper, but it can also improve the dispersion stability of silicone rubber powder in water. Polydiorganosiloxanes containing such polyether groups are, for example, expressed by the general formula

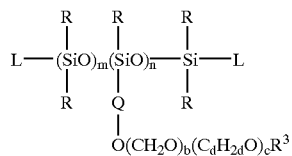

The R's express identical or different monovalent hydrocarbon groups having 1 to 20 carbon atoms. The same groups as above may be cited as examples. In particular, groups that are at least methyl groups are preferred. $R^3$ is a hydrogen atom or a monovalent organic group having 1 to 5 carbon atoms. Methyl, ethyl, propyl, and other alkyl groups, as well as acetyl, propionyl, and other acyl groups are examples of the monovalent organic groups designated by $R^3$. Q is a divalent hydrocarbon group. The same groups as above are examples. In particular, propylene groups are preferred, and ethylene and propylene groups are further preferred. The L's may be the same or different, and are hydroxyl groups, alkoxy groups, monovalent hydrocarbon groups having 1 to 20 carbon atoms, or polyether groups expressed by the formula —Q—O—$(C_2H_4O)_b(C_dH_{2d}O)_c$—$R^3$. Methoxy, ethoxy, propoxy, and butoxy groups are examples of the alkoxy groups designated by L, and the same groups as those designated by R above are examples of the monovalent hydrocarbon groups designated by L. The m is an integer of 1 or greater, and n is an integer of 1 or greater, but may be 0 when at least one of the two L's is a polyether group expressed by the formula —Q—O—$(C_2H_4O)_b(C_dH_{2d}O)_c$—$R^3$. The sum (m+n) is an integer of at least 1. Symbol b designates identical or different integers of 0 to 50. Symbol c designates identical or different integers of 0 to 50. However, at least one of b and c is an integer of 1 to 50. The d in the above formula should preferably be an integer of 3 or greater, and particularly 3 or 4. Oxyethylene groups expressed by the formula $C_2H_4O$ and oxyalkylene groups expressed by the formula $C_dH_{2d}O$ may be block-polymerized or randomly polymerized. Although not subject to limitations, the content of polyether groups in a polydiorganosiloxane containing such polyether groups should preferably fall within a range of 30 to 60 wt %. In a polydiorganosiloxane containing such polyether groups, the polyether groups expressed by the formula —Q—O—$(C_2H_4O)_b(C_dH_{2d}O)_c$—$R^3$ may be bonded to the side chains of the molecular chain, to the ends of the molecular chain, or to both.

Polydimethylsiloxanes are, for example, expressed by the general formula

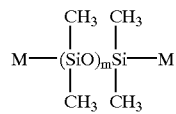

The M's may be the same or different, and are hydroxyl groups, alkoxy groups, or monovalent hydrocarbon groups having 1 to 20 carbon atoms. Methoxy, ethoxy, propoxy, and butoxy groups can be cited as examples of the alkoxy groups designated by M, and the same groups as those designated by R above can be cited as examples of the monovalent hydrocarbon groups designated by M. The m is an integer of 1 or greater.

Although no limitations are imposed on the amount in which silicone oil can be added to the present treatment agent, the addition should preferably be as follows, indicated in increasing order of preference per 100 weight parts silicone rubber powder: 3000 weight part or less, 2000 weight parts or less, 1500 weight part or less, 5 to 3000 weight parts, 5 to 2000 weight parts, and 5 to 1500 weight parts. This is done in order to render the wiping paper dry to the touch and nonsticky.

When added to the present treatment agent, the silicone oil should preferably be introduced as a water dispersion to the above-described water dispersion of a silicone rubber powder. Agitators, homomixers, line mixers, colloid mills, homogenizers, and the like are commonly used to disperse the silicone oil in water. In the process, the surfactants, and nonionic emulsifiers in particular, should preferably be added to improve the stability of silicone oil in the water dispersion. Although not subject to limitations, the amount in which these surfactants are added should preferably be 0.1 to 20 weight parts, and particularly 0.5 to 10 weight parts, per 100 weight parts silicone oil. Although no limitations are imposed on the particle size of the droplets of silicone oil in the water dispersion of the silicone oil, the average particle diameter thereof should preferably fall within a range of 0.01 to 1000 micrometers, and when the silicone oil is a polyorganosiloxane in which organic groups containing amino groups or organic groups containing carboxyl groups are contained in an amount of about 2 mol % per molecule, this oil can be dispersed in water in the form of droplets having an average particle diameter of 0.01 to 0.1 micrometers with the aid of a common agitator and without the use of special emulsifying equipment. For other organopolysiloxanes, it is better to use colloid mills, homogenizers, or other emulsifying apparatus. In this case, the average particle diameter of the droplets is commonly 2 to 10 micrometer. The average particle diameter is commonly 0.2 to 5 micrometers when the droplets are obtained by dispersing cyclic diorganosiloxanes in water with the aid of a homogenizer or other emulsifying apparatus, and polymerizing the resulting dispersion.

The treatment agent may also contain other arbitrary components, such as ethylene glycol, polyethylene glycol (one having a molecular weight of 100 to 200, for example), diethylene glycol, triethylene glycol, propylene glycol, glycerin, pentaerythritol, sorbitol, mannitol, glucose, sucrose, fruit sugar, gluconic acid and other humectants expressed by the formula

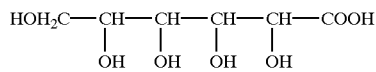

quaternary ammonium salts and other silane-based or organic antibacterials, and fragrances.

Examples of methods for treating wiping paper with the treatment agent include methods in which the treatment agent is dried after being sprayed directly onto wiping paper; methods in which the treatment agent is sprayed before, during, or after pulp drying; and methods in which the treatment agent is dried after being deposited on wiping paper using kiss rolls or a gravure coater. When wiping paper is treated with the treatment agent, this treatment should preferably be performed to the extent that the total amount of silicone components in the treatment agent (that is, the total amount of silicone rubber powder or the total amount of silicone rubber powder and silicone oil) constitutes 0.2 to 5.0 wt %, and particularly 0.5 to 3.0 wt %, of the wiping paper. When the treatment is conducted by drying the treatment agent after spraying it directly onto wiping paper, the drying method should preferably involve heating and drying the material at 50 to 150° C.

Because it comprises a water dispersion of a silicone rubber powder having an average particle diameter of 0.1 to 500 micrometers, the proposed aqueous treatment agent for wiping paper is characterized by being capable of rendering tissue paper, toilet paper, and other types of wiping paper dry to the touch, highly smooth, nonsticky, and extremely soft while suppressing the slippery or wet feel thereof.

Tissue paper, toilet paper, or another type of wiping paper treated with the treatment agent is very soft and smooth, has a moist feel (appears to be slightly moistened to the touch), elicits a very pleasant sensation in the skin, and has the attributes of a high-quality product.

EXAMPLES

In these examples, the viscosity is measured at 25° C. Treated wiping paper was evaluated in the following manner.
Hand Commercially available tissue paper (two-ply; length: 229 mm; width: 197 mm), which had been proven to be free of deposited silicone by fluorescent X-ray spectroscopy, was spread on a wire mesh and coated on the obverse and reverse sides with an aqueous treatment agent for wiping paper, which was sprayed with a simple spray (spraying air pressure: 0.5 kg/cm$^2$) such that the silicone components were deposited in an amount of 1.0 wt % in relation to the tissue paper. The tissue paper coated with the treatment agent was then dried for 5 minutes in a 130° C. drier. Five pieces of the tissue paper thus treated were folded, and hand was determined by touch.
Nose Rubbing Properties A single piece of the tissue paper thus treated was folded over and used to vigorously rub the skin around the nose ten times at 5-minute intervals. The condition of the skin was visually evaluated and graded in the following manner.
1: No change in skin condition
2: Slight reddening of skin
3: Noticeable reddening of skin
In the tables, "2-1" indicates slight reddening of the skin with hardly any change.
Moisture Absorbability A drop of water was allowed to fall from a pipette onto the tissue paper thus treated, and the time (in seconds) needed for this drop to be absorbed by the tissue paper was measured.
Overall Score The quality of the aqueous treatment agent for wiping paper was determined in the following manner on the basis of the above-described evaluation results.
1: Good
2: Fair
3: Poor
In the tables, "2-1" means good with minor reservations, "1-2" means mostly fair and occasionally good, and "3-2" means mostly poor and occasionally fair.

Reference Example 1

A silicone rubber composition was prepared by uniformly mixing 96 weight parts of a dimethylvinylsiloxy-endblocked polydimethylsiloxane having a viscosity of 400 mPa·s, 4 weight parts of a trimethylsiloxy-endblocked polymethylhydrogen-siloxane having a viscosity of 20 mPa·s, 6 weight parts of a trimethylsiloxy-endblocked polydimethylsiloxane having a viscosity of 20 mPa·s, and an isopropyl alcohol solution of chloroplatinic acid (used in an amount such that the content of platinum metal atoms in the alcohol solution was 20 ppm (weight units) with respect to the dimethylvinylsiloxy-endblocked polydimethylsiloxane). The silicone rubber obtained by curing the resulting composition (which was allowed to stand for 1 day at room temperature) had a type A durometer hardness (determined based on JIS K 6253) of 28.

The entire silicone rubber composition was subsequently emulsified with 53 weight parts of a 3-wt % aqueous solution of polyoxyethylene nonyl phenyl ether (HLB: 13.1), and 50 weight parts purified water were then added, yielding a water dispersion of the silicone rubber composition. This water dispersion was allowed to stand for 1 day at room temperature to cure the silicone rubber composition, and a water dispersion of a silicone rubber powder was prepared. This silicone rubber powder consisted of spherical particles and had an average particle diameter of 4 micrometers.

100 weight parts toluene were added to 100 weight parts of a silicone rubber powder obtained by removing water from the water dispersion, and the product was first agitated for 30 minutes at 500 rpm in a homodisperser and then allowed to stand for 12 hours. The product was then re-agitated for 10 minutes at 500 rpm in the homodisperser and subsequently filtered through filter paper. An uncross-linked silicone oil with a viscosity of 20 mPa·s was recovered by removing toluene from the resulting filtrate. The content of the uncross-linked silicone oil in the silicone rubber powder was measured and found to be 6 wt %. This uncross-linked silicone oil was subjected to gel permeation chromatography, infrared spectroscopic analysis, and $^1$H nuclear magnetic resonance analysis. The principal component of the product was a trimethylsiloxy-endblocked polydimethylsiloxane.

Reference Example 2

A silicone rubber composition was prepared by uniformly mixing 90 weight parts of a dimethylvinylsiloxy-endblocked polydimethylsiloxane having a viscosity of 400 mPa·s, 3 weight parts of a trimethylsiloxy-endblocked dimethylsiloxane/methyl-hydrogensiloxane copolymer having a viscosity of 20 mPa·s, 6 weight parts of a trimethylsiloxy-endblocked polydimethylsiloxane having a viscosity of 500 mPa·s, and an isopropyl alcohol solution of chloroplatinic acid (in an amount such that the content of platinum metal atoms in the alcohol solution was 20 ppm (weight units) with respect to the dimethylvinylsiloxy-endblocked polydimethylsiloxane). The silicone rubber obtained by curing the resulting composition (which was allowed to stand for 1 day at room temperature) had a type A durometer hardness (determined based on JIS K 6253) of 27.

The entire silicone rubber composition was subsequently emulsified with 53 weight parts of a 3-wt % aqueous solution of polyoxyethylene nonyl phenyl ether (HLB: 13.1), and 50 weight parts purified water were then added, yielding a water dispersion of the silicone rubber composition. This water dispersion was allowed to stand for 1 day at room temperature to cure the silicone rubber composition, and a water dispersion of a silicone rubber powder was prepared. This silicone rubber powder consisted of spherical particles and had an average particle diameter of 2 μm.

1000 weight parts toluene were added to 100 weight parts of a silicone rubber powder obtained by removing water from the water dispersion, and the product was first agitated for 30 minutes at 500 rpm in a homodisperser and then allowed to stand for 12 hours. The product was then re-agitated for 10 minutes at 500 rpm in the homodisperser and subsequently filtered through filter paper. An uncross-linked silicone oil with a viscosity of 500 mPa·s was recovered by removing toluene from the resulting filtrate. The content of the uncross-linked silicone oil in the silicone rubber powder was measured and found to be 6 wt %. This uncross-linked silicone oil was subjected to gel permeation chromatography, infrared spectroscopic analysis, and $^1$H nuclear magnetic resonance analysis, and it was found that the principal component of the product was a trimethylsiloxy-endblocked polydimethylsiloxane.

Reference Example 3

A polydiorganosiloxane water dispersion was prepared by dispersing with the aid of a homomixer 15 weight parts of the amino group-containing polydiorganosiloxane (amino group content: 0.82 wt %; viscosity: 1250 mPa·s) expressed by the formula

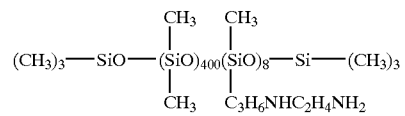

3 weight parts of a polyoxyethylene (6 mol added) lauryl ether-type nonionic surfactant, 2 weight parts of a polyoxyethylene (8 mol added) lauryl ether-type nonionic surfactant, 0.2 weight part acetic acid, and 79.8 weight parts water. The droplets of polydiorganosiloxane in the water dispersion had an average particle diameter of 50 μm.

Reference Example 4

A polydiorganosiloxane water dispersion was prepared by dispersing with the aid of a homomixer 15 weight parts of the polyether group-containing polydiorganosiloxane (polyether group content: 30.0 wt %; viscosity: 2900 mPa·s) expressed by the formula

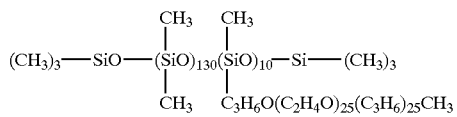

3 weight parts of a polyoxyethylene (6 mol added) lauryl ether-type nonionic surfactant, 2 weight parts of a polyoxyethylene (8 mol added) lauryl ether-type nonionic surfactant, 0.2 weight part acetic acid, and 79.8 weight parts water. The droplets of polydiorganosiloxane in the water dispersion had an average particle diameter of 20 μm.

Reference Example 5

A polydimethylsiloxane water dispersion was prepared by dispersing with the aid of a homomixer 400 weight parts of a trimethylsiloxy-endblocked polydimethylsiloxane having a viscosity of 350 mPa·s, 20 weight parts of a polyoxyethylene lauryl ether-type nonionic surfactant (5 mol added), 10 weight parts o/f a polyoxyethylene nonyl phenyl ether-type nonionic surfactant (85 mol added), 5 weight parts of polyoxyethylene nonyl phenyl ether sodium sulfonate (4 mol added), and 565 weight parts water. The droplets of polydimethylsiloxane in the water dispersion had an average particle diameter of 500 micrometers.

Examples 1 to 4, Comparisons 1 and 2

The water dispersion of silicone rubber powder prepared in Reference Example 1 and the polydiorganosiloxane water dispersion prepared in Reference Example 3 were uniformly mixed in the weight ratios of silicone rubber powder and polydiorganosiloxane shown in Table 1, yielding aqueous treatment agents for wiping paper. Tissue paper was treated with these treatment agents. The treated tissue paper was evaluated for its hand, nose rubbing properties, and moisture absorbability. For comparison, untreated tissue paper was also evaluated for its hand, nose rubbing properties, and moisture absorbability. The results are in Table 1.

TABLE 1

|  | Example 1 | Example 2 | Example 3 | Example 4 | Comparison 1 | Comparison 2 |
|---|---|---|---|---|---|---|
| Silicone rubber powder (weight parts) | 100 | 100 | 100 | 100 | 0 | — |
| Polydiorganosiloxane (weight parts) | 0 | 20 | 1000 | 3500 | 100 | — |
| Hand | Slight stiffness noted, but nonsticky with good slip and hand | Very soft and spongy, excellent hand, no slipperiness at all | Soft, spongy, good hand, no slipperiness or moistness | Somewhat slippery | A pronounced slippery and wet feel. Insufficient lightness | No sponginess or slip, rough and stiff |
| Nose rubbing properties | 1 | 1 | 1 | 1 | 1 | 3 |
| Overall score | 1–2 | 1 | 1 | 2–1 | 3–2 | 3 |

Examples 5 to 7, Comparison 3

The water dispersion of silicone rubber powder prepared in Reference Example 1 and the polydiorganosiloxane water dispersion prepared in Reference Example 4 were uniformly mixed in the weight ratios of silicone rubber powder and polydiorganosiloxane shown in Table 2, yielding aqueous treatment agents for wiping paper. Tissue paper was treated with these treatment agents. The treated tissue paper was evaluated for its hand, nose rubbing properties, and moisture absorbability. The results are shown in Table 2.

TABLE 2

|  | Example 5 | Example 6 | Example 7 | Comparison 3 |
|---|---|---|---|---|
| Silicone rubber powder (weight parts) | 100 | 100 | 100 | 0 |
| Polydiorganosiloxane (weight parts) | 20 | 1000 | 3500 | 100 |
| Hand | Slight stiffness noted, but nonsticky and with good hand | Soft and smooth | Somewhat lacking in smoothness and slip | Smoothness and slip completely unacceptable |
| Nose rubbing properties | 1 | 1 | 2–1 | 2 |
| Moisture absorbability (sec) | 0 | 0 | 0 | 0 |
| Overall score | 1 | 1 | 2–1 | 2 |

Examples 8 and 9, Comparison 4

The water dispersion of silicone rubber powder prepared in Reference Example 2 and the polydiorganosiloxane water dispersion prepared in Reference Example 4 were uniformly mixed in the weight ratios of silicone rubber powder and polydiorganosiloxane shown in Table 3, yielding aqueous treatment agents for wiping paper. Tissue paper was treated with these treatment agents. The treated tissue paper was evaluated for its hand, nose rubbing properties, and moisture absorbability. The results are shown in Table 3.

TABLE 3

|  | Example 8 | Example 9 | Comparison 4 |
|---|---|---|---|
| Silicone rubber powder (weight parts) | 100 | 100 | 0 |
| Polydiorganosiloxane (weight parts) | 0 | 1000 | 100 |
| Hand | Slight stiffness noted, but nonsticky, smooth, and with good slip | No stiffness; soft and smooth | Inadequate smoothness and slip |
| Nose rubbing properties | 1 | 1 | 2 |
| Moisture absorbability (sec) | 0 | 0 | 0 |
| Overall score | 1–2 | 1 | 2 |

Examples 10 to 13, Comparison 5

The water dispersion of silicone rubber powder prepared in Reference Example 1 and the polydimethylsiloxane water dispersion prepared in Reference Example 5 were uniformly mixed in the weight ratios of silicone rubber powder and polydiorganosiloxane shown in Table 4, yielding aqueous treatment agents for wiping paper. Tissue paper was treated with these treatment agents. The treated tissue paper was evaluated for its hand, nose rubbing properties, and moisture absorbability. The results are shown in Table 4.

TABLE 4

|  | Example 10 | Example 11 | Example 12 | Example 13 | Comparison 5 |
|---|---|---|---|---|---|
| Silicone rubber powder (weight parts) | 100 | 100 | 100 | 100 | 0 |
| Polydiorganosiloxane (weight parts) | 20 | 500 | 1000 | 3500 | 100 |
| Hand | Soft, spongy, nonsticky (dry to the touch), good hand | Soft, spongy, nonsticky (dry to the touch), good hand | Soft, spongy, nonsticky (dry to the touch), good hand | Soft but with a somewhat moist and slippery feel | Soft but with a pronounced moist and slippery feel |
| Nose rubbing properties | 1 | 1 | 1 | 1 | 1 |
| Moisture absorbability (sec) | 0 | 0 | 0 | 0 | 0 |
| Overall score | 1 | 1 | 1 | 2–1 | 3 |

What is claimed is:

1. A method for treating wiping paper, wherein the method comprises the steps of:

I) depositing an aqueous treatment agent on a wiping paper, wherein the aqueous treatment agent comprises a dispersion of a silicone rubber powder having an average particle diameter of 0.1 to 500 micrometers, a surfactant, water, and a silicone oil, wherein the silicone oil has the formula:

$$A-(SiO)_m(SiO)_n-Si-A$$

with R groups on the silicons as shown (R, R, R on left Si substituents; R' on middle Si; R, R on right Si), wherein each R is independently selected from the group consisting of a monovalent hydrocarbon group having 1 to 20 carbon atoms, an alkenyl group, and an aryl group; each R' is independently a monovalent organic group selected from the group consisting of amino, epoxy, carboxyl, oxyalkylene, mercapto, fluoroalkyl, carbinol, and amido groups; each A is independently selected from the group consisting of hydroxyl groups, alkoxy groups, monovalent hydrocarbon groups having 1 to 20 carbon atoms, amino groups, epoxy groups, carboxyl groups, oxyalkylene groups, mercapto groups, fluoroalkyl groups, carbinol groups, and amido groups; m is an integer of 1 or greater; n is an integer of 0, 1, or greater; and with the proviso that (m+n) is an integer of at least 10; and II) heating the product of step (I).

2. The method of claim 1, wherein the wiping paper is selected from the group consisting of tissue paper and toilet paper.

3. The method of claim 1, wherein the average particle diameter of the silicone rubber powder is 0.1 to 100 micrometers.

4. The method of claim 1, wherein the treatment agent further comprises a humectant, an anti-bacterial, a fragrance, or a combination thereof.

5. The method of claim 1, wherein the method is performed to the extent that total amount of silicone rubber powder and silicone oil in the treatment agent constitutes 0.2 to 5.0 weight % of the wiping paper.

6. The method of claim 1, wherein the surfactant is selected from polyoxyethylene nonyl phenyl ether, polyoxyethylene lauryl ether nonionic surfactant, and polyoxyethylene nonyl phenyl ether sodium sulfonate.

7. The method of claim 1, wherein the treatment agent is deposited on the wiping paper using kiss rolls or a gravure coater.

8. The method of claim 1, wherein step (II) is conducted by heating at 50 to 150° C.

9. The method of claim 1, wherein the treatment agent is coated on the obverse and reverse sides of the wiping paper.

* * * * *